United States Patent [19]

Allwörden

[11] Patent Number: 5,546,736
[45] Date of Patent: Aug. 20, 1996

[54] HARVESTER FOR GREEN FODDER PREPARATION

[75] Inventor: Wilhelm V. Allwörden, Oberstotzingen, Germany

[73] Assignee: SAME S.p.A., Treviglio, Italy

[21] Appl. No.: 393,015

[22] Filed: Apr. 20, 1995

[30] Foreign Application Priority Data

Sep. 1, 1992 [DE] Germany ............... 42 29 060.0

[51] Int. Cl.⁶ .................................................. A01D 82/00
[52] U.S. Cl. ........................... 56/16.4 B; 56/DIG. 1
[58] Field of Search ............... 56/16.4 B, 16.4 A, 56/16.4 C, 192, DIG. 1

[56] References Cited

U.S. PATENT DOCUMENTS 4,265,076   5/1981   Krutz ..................... 56/DIG. 1 X
4,580,395   4/1986   Castoldi ................ 56/16.4 B

FOREIGN PATENT DOCUMENTS 0205206    12/1986   European Pat. Off. ......... 56/DIG. 1
1407158     6/1959   Germany .
2606476     2/1976   Germany .
2817793     4/1978   Germany .
3242424A1  11/1982   Germany .
WO90/12492  4/1989   Germany .
3939618A1  11/1989   Germany .
3815771    11/1989   Germany ................... 56/DIG. 1

Primary Examiner—Terry Lee Melius
Attorney, Agent, or Firm—Hardaway Law Firm P A; Charles L. Schwab

[57] ABSTRACT

A mobile green fodder conditioner operable to produce a forage mat of nearly uniform thickness and good coherence, the conditioner including at least one mechanically deformable cylinder disposed on a horizontal axis transverse to the direction of travel.

10 Claims, 8 Drawing Sheets

5,546,736

HARVESTER FOR GREEN FODDER PREPARATION

TECHNICAL FIELD

This invention relates to a harvester in the form of a mobile green fodder conditioner preparation having at least one pressing device for the acceleration of the drying process of mowed grass, consisting of at least two pressing elements.

BACKGROUND OF THE INVENTION

European Patent Document PCT/EP90/00487 discloses a process for green fodder preparation in which mowed grass, for the acceleration of the drying process, is conveyed through a pressing nip by counter-rotating pressing elements and, for the production of a grass mat having substantially uniform density and cross section, the volume of grass supplied to the pressing nip is measured and the conveying speed of the pressing elements is controlled in dependence thereon. It has proved disadvantageous that, despite this control, the thickness of the grass mat distributed over the width of the grass mat is not of a uniform thickness. The use of rigid pressing elements (for example steel cylinders) has the consequence that the grass mat is partially not pressed. A loosening occurs in the grass mat where pressing is inadequate, and thus the drying process and also the subsequent picking-up process are impaired. In case of contaminants (e.g., due to stones) or too large a volume of grass, delays or failures of the preparation process occur.

From German patent document DE-OS 28 17 793 there is known a device for green fodder preparation, which has one pressing device for the acceleration of the drying process of mowed grass, consisting of two cylinders, the cylinders forming a pressing nip through which the grass is conveyed. The cylinders of the before mentioned pressing device are made elastically deformable. Further concrete information on the arrangement of the cylinders cannot be understood from this document. While the before mentioned document discloses a pressing device having two cylinders assigned to one another to form a nip through which the grass is, it does not disclose a pressing device consisting of a plurality of cylinders together with a belt around at least two cylinders.

OBJECTS AND SUMMARY OF THE INVENTION

It is an object of the invention to make a harvester for green fodder preparation in such a fashion that varying quantities of supplied grass are uniformly pressed and an optimum coherence of the pressed grass mat is insured. Furthermore, disturbances in the preparation process are to be avoided insofar as possible.

This object is achieved by virtue of the fact that at least one element (a cylinder) of the pressing device of the harvester is made elastically deformable, the pressing device consisting of an upper part and a lower part each having at least one element. It has been found that on the basis of the use of elastically deformable cylinders, varying quantities of supplied grass are pressed uniformly and a nearly uniform thickness of the grass mat results. It is conceivable that only one single cylinder, a plurality, or all cylinders of one part or of both parts of the pressing device are made elastically deformable. Similarly, one part can employ only rigid cylinders and the other part only mechanically deformable cylinders. Further, by virtue of the deformability, in particular by virtue of a partial deformation of the cylinder, it is insured that the grass mat is uniformly pressed over its width. This is also particularly the case when the volume of grass supplied is not uniform. Further, the elastic deformability of the cylinders has the advantage that contaminants (e.g., due to stones) can pass through the pressing nip. By this means, a delay or a failure of the preparation process is effectually avoided. In one embodiment of the invention, the cylinder has a rigid core with an elastically deformable coating. The elastically deformable coating is, for example, a vulcanized rubber or unvulcanized rubber layer that is applied to the exterior surfaces of the cylinder. This design has, along with the advantages previously cited, the advantage that a harvester having rigid cylinders (e.g., steel cylinders) can be easily refitted as a pressing device.

In further developments of the invention, the cylinders are made as pneumatic tires or solid rubber tires. The use of cylinders in the form of pneumatic tires (rim with tire) has the advantage that the width of the pressing nip and the pressing pressure are adjustable by means of variation of the air pressure. It is conceivable to adjust the air pressure manually or automatically (controllably). In the case of the making of the cylinder as a solid rubber tire, the same effect can be achieved; various rubber blends can be used to obtain various pressures. In an arrangement of a plurality of cylinders one behind another, it is possible for the cylinder arranged at the beginning of one part of the pressing device to have a soft rubber composition and the subsequently arranged cylinders to have harder compositions. A combination of the stated designs (rigid core with coating, pneumatic tire, solid rubber tire) with one another as well as with rigid cylinders is also possible. Moreover, the deformable coating of the cylinder having rigid core as well as pneumatic tires and solid rubber tires, may be variously profiled.

Conceivable profiles are, for example, diamonds, knobs, grooves (transverse or longitudinal grooves), as well as combinations of the cited profiles with one another and with further geometric profiles. On the basis of the profiling, a removal of moisture that results in the pressing process is advantageously possible. For this purpose, the interstices (e.g., grooves) resulting from profiling are oriented outwardly from the center of a tire (comparably to, for example, the profile of an automobile tire).

In development of the invention, at least one part of the pressing device consists of a belt guided around at least two cylinders (in particular, a drive cylinder and a guide cylinder). In a special development, both parts of the pressing device have a belt guided around at least two cylinders. Also with the use of at least one cylinder that is elastically deformable, this pressing and conveying device, has the advantage that the pressing process yields a uniform thickness of the grass mat and an optimum coherence of the pressed grass mat is insured.

In a further embodiment of the invention, the belt of the pressing device is perforated, by which means the moisture or liquid arising during the pressing process is reliably removable and the drying process is accelerated.

BRIEF DESCRIPTION OF THE DRAWINGS

Various embodiments of the are illustrated in the drawings, in which:

FIG. 2b is a view in section taken along line II—II in FIG. 2a.

FIG. 3b is a top view of the pressing device shown in FIG. 3a.

FIG. 4b is a view in section taken along the line IV—IV in FIG. 4a.

FIG. 5b is a view in section taken along the line V—V in FIG. 5a.

DETAILED DESCRIPTION OF THE DRAWINGS

Figure 1A:
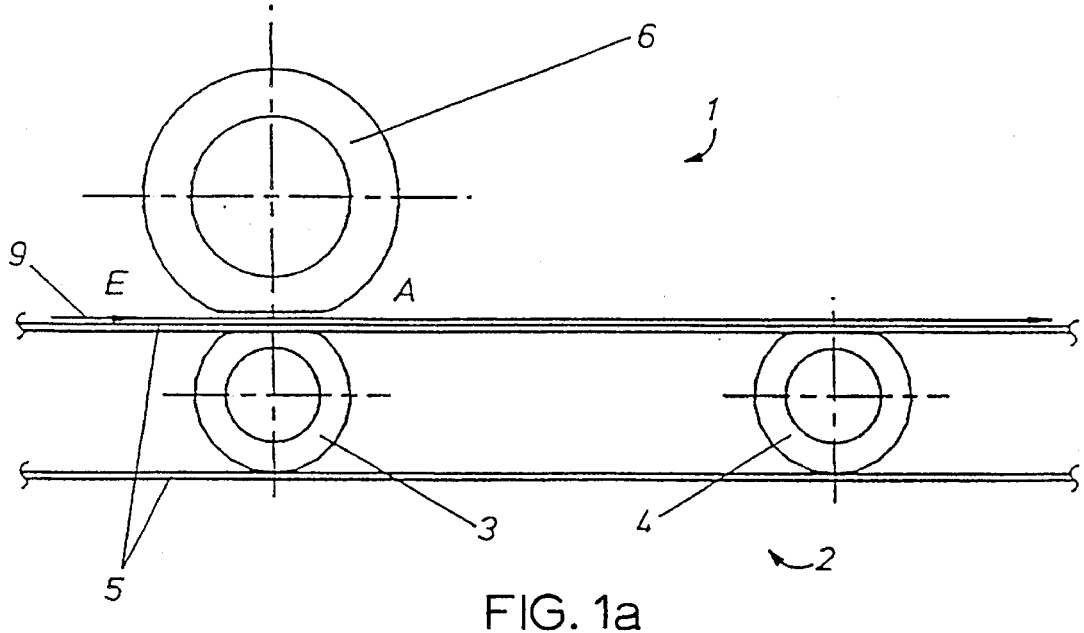
FIG. 1*a* is a side view of a pressing device having at least two cylinders.

In all the drawing FIGS., an inlet region (to which the grass is supplied) is identified by the letter E, and correspondingly a discharge region is identified by the letter A. Connected upstream and downstream of these regions are appropriately designed conveying and processing devices, respectively.

Figure 1B:
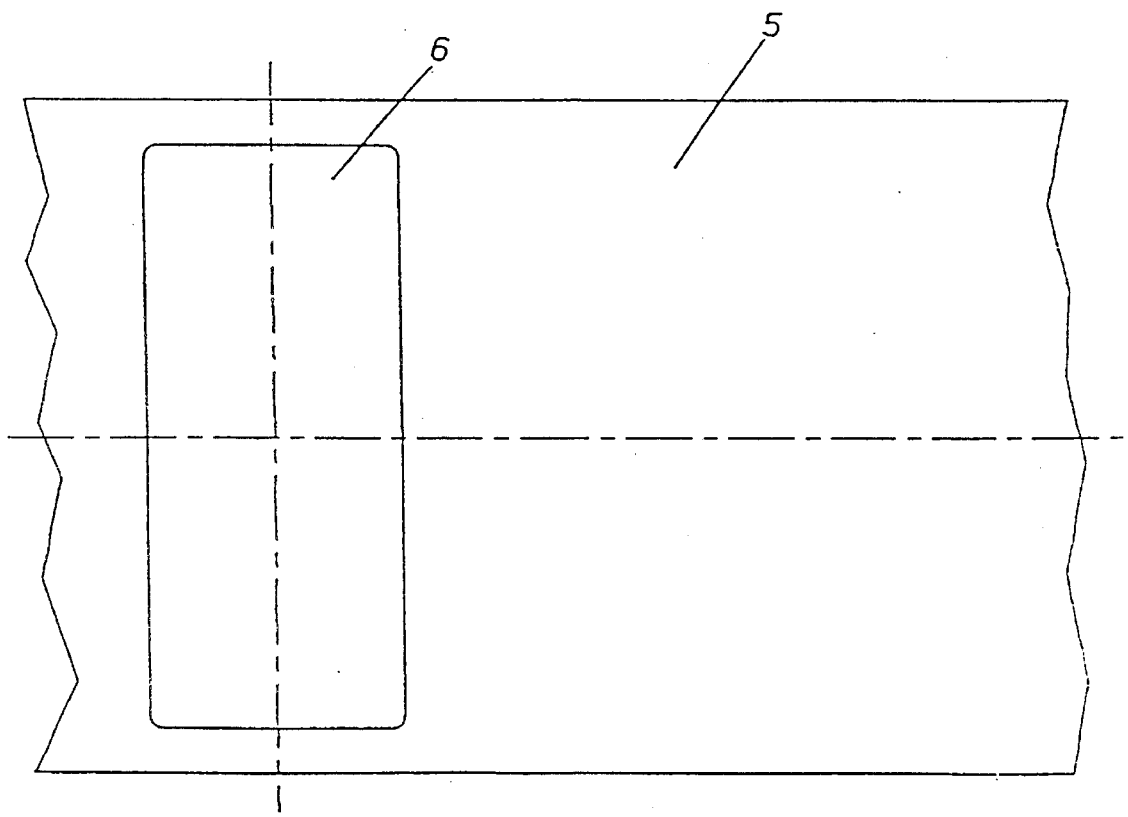
FIG. 1*b* is a top view of the pressing device shown in FIG. 1*a*.

FIGS. 1a and 1b show a pressing device having at least two cylinders. The pressing device consists of a first part 1 and a second part 2. The part 2 essentially consists of a cylinder, which is made for example as a drive cylinder 3. As illustrated, this part 2 also includes a cylinder 4 and a belt 5 (conveyor belt) guided by the drive cylinder 3 and the cylinder 4. One or both cylinders 3 and 4, respectively, can be cylinders (guide cylinders) around which the belt 5 is guided.

The part 1 includes a pressure cylinder 6, the pressure cylinder 6 and the drive cylinder 3 forming a pressing nip through which the grass 9 is conveyed. According to the invention, at least one of the cylinders 3, 4 or 6 is made elastically deformable. As shown in FIG. 1b, the pressure cylinder 6 extends over approximately the entire width of the belt 5. At each side of the belt 5 a guiding device in the form of a sheet-metal deflector may be installed by which the width of the grass mat is determined. The pressure cylinder 6, via a direct or indirect connection to the drive cylinder 3, is driven by the drive cylinder or follows without driving.

Figure 2A:
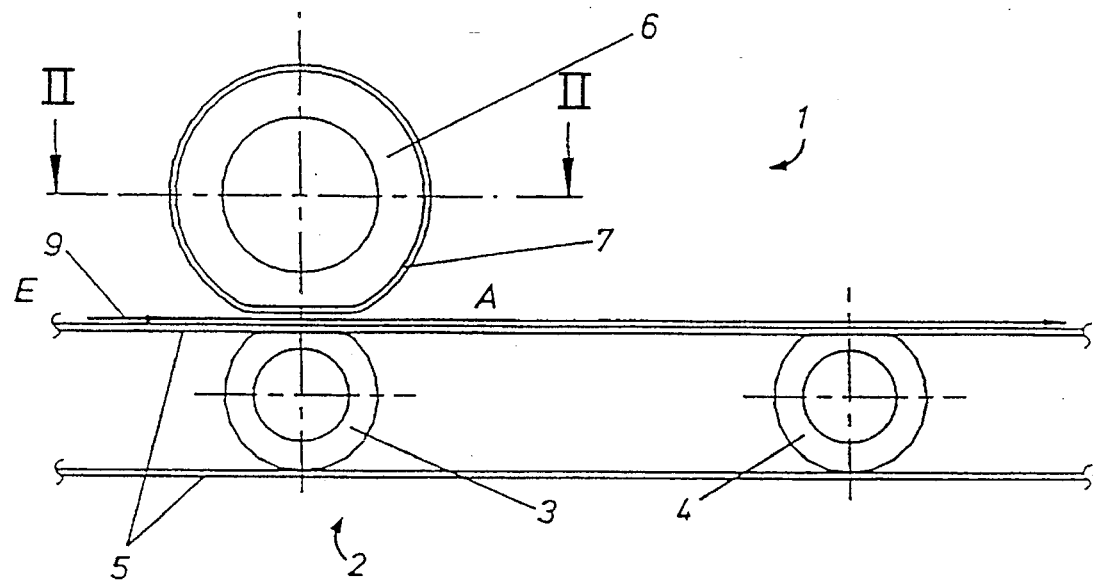
FIG. 2a is side view of a pressing device having a cylinder consisting of partial cylinders.
Figure 2B:
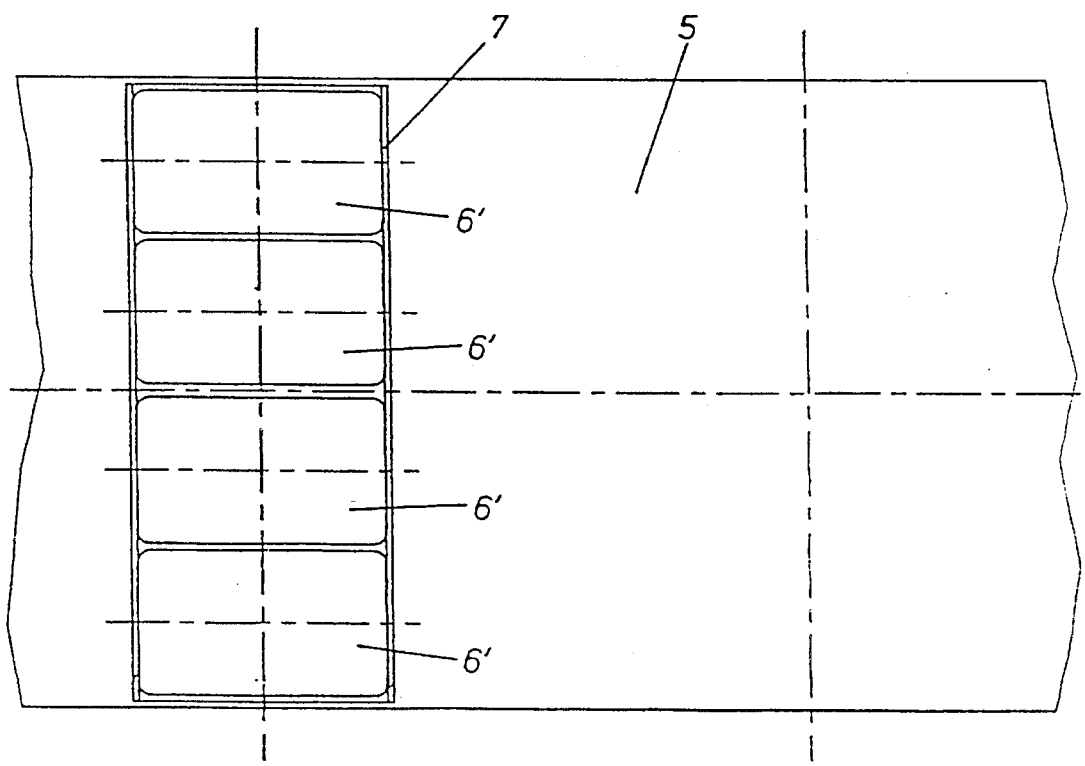

FIGS. 2a and 2b show a pressing device having a cylinder consisting of partial cylinders in the form of annular segments. The pressure cylinder consists of a plurality of partial cylinders 6', which are arranged on a single axle. As shown in FIG. 2b, the partial cylinders 6' are individual rigid cylinders, which jointly are provided with a tubular shaped coating 7 (e.g., vulcanized rubber or unvulcanized rubber). Moreover, it is conceivable to provide the partial cylinders individually with the coating 7. Further, the partial cylinders 6' can be made as pneumatic tires or as solid rubber tires. Further, it is conceivable to support at least the axle of the pressure cylinder 6 (or of the partial cylinders 6') movably and to load the axle with a force. This is also conceivable for further or for all axles of the cylinders. In FIG. 2a, the direction of the force is indicated by means of two arrows. It is conceivable to support one single axle of the pressure cylinder 6 or to support the individual axles of the partial cylinders 6' in an adjustable manner. By means of a position change of a cylinder (in particular of the pressure cylinder 6) relative to a further cylinder (in particular relative to the drive cylinder 3), a variation or adjustment of the pressing nip for the grass 9 is effected. On the basis of the force loading or of a force control (e.g., hydraulically), the pressing force is individually adjustable, so that a constam and uniform thickness of the grass mat is realizable. A force loading by means of spring force is likewise conceivable. Similarly, the pressing nip can be adjusted to a constant width either manually or drivably (e.g., motor-driven spindles). The width can be adjustable variably (continuously) or stepwise.

Figure 3A:
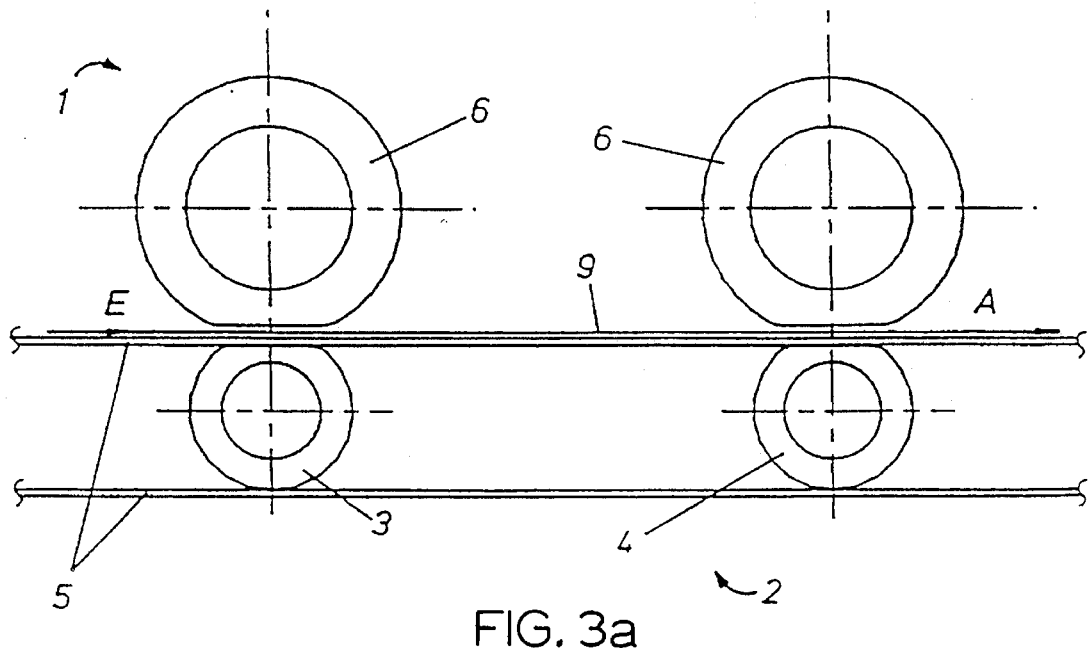
FIG. 3a is a side view of a pressing device having a plurality of cylinders consisting of partial cylinders.
Figure 3B:
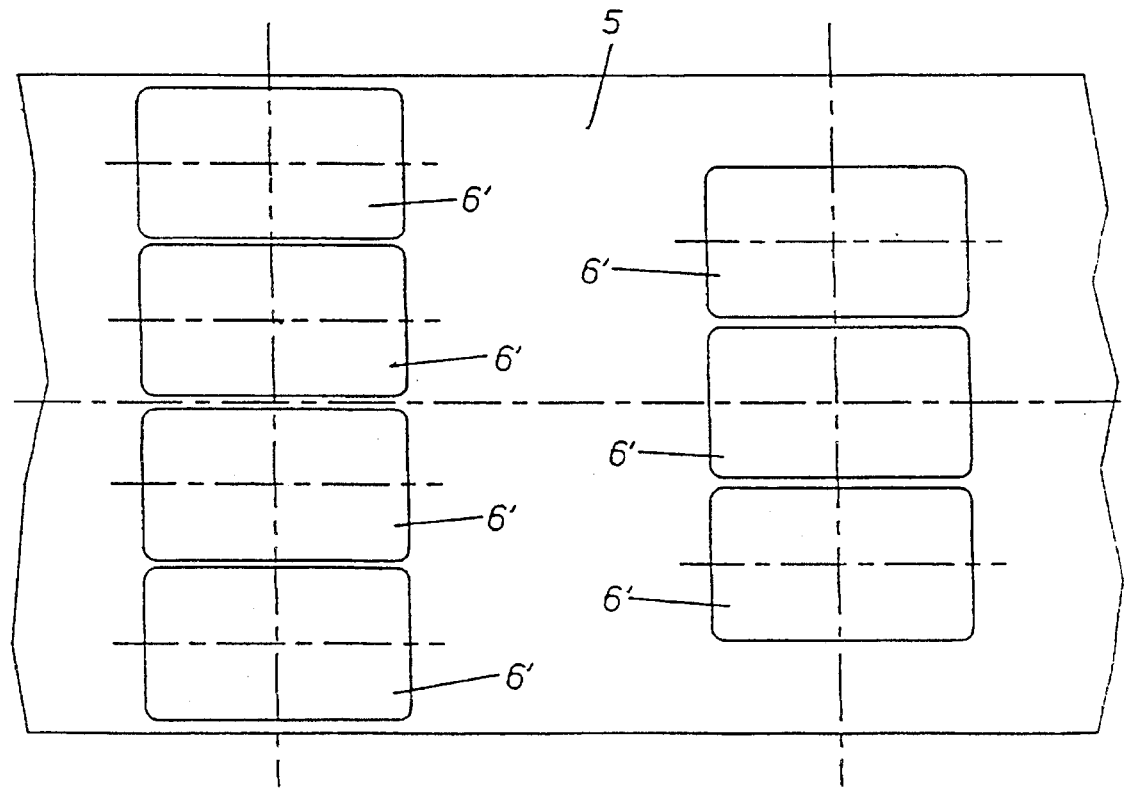

FIG. 3a and 3b show a pressing device having a plurality of cylinders consisting of partial cylinders. Along with the components shown in FIGS. 2a and 2b and provided with the same reference numbers, the part 1 includes an additional pressure cylinder 6, the drive cylinder 3 or the guide cylinder 4 of the pressing device being assigned to the respective pressure cylinders 6 of the part 1 arranged one behind another. The pressure cylinders 6 in turn consist of a plurality of partial cylinders 6', which are individually elastically deformable. Similarly, it is conceivable that the drive cylinder 3 or the guide cylinder 4 of the lower part 2 consist of partial cylinders (analogously to the pressure cylinder 6). Between the two pressure cylinders 6 as well as between the drive cylinder 3 and the guide cylinder 4, respectively, further cylinders can be arranged. The pressure cylinder 6 and drive cylinder 3 (or cylinder 4) shown in FIG. 3a consists of partial cylinders similar to 6', of which the exterior surfaces in the pressing region (plan view in FIG. 3b) are assigned to one another, that is, a partial cylinder (not shown) of the drive cylinder 3 (or cylinder 4) is assigned to a partial cylinder 6'. In case of unequal width of the partial cylinders, the exterior surfaces can overlap. Also conceivable is a different number of partial cylinders on the several cylinders. With reference to the arrangement of partial cylinders 6' shown in FIG. 3b, the use of an unequal number of partial cylinders on the cylinders is particularly advantageous. In FIG. 3b, four partial cylinders 6' are arranged on the left side and three partial cylinders 6' are arranged on the right side. This staggered arrangement of the individual partial cylinders has the advantage that the supplied grass is pressed by the partial cylinders arranged at left and a web remains in the region between these partial cylinders. Upon further transport by means of the belt 5, this web is then grasped and pressed by the partial cylinders 6' arranged at right in FIG. 3b. On the basis of this mode of processing, the pressure forces of the partial cylinders are greater than in the case of a cylinder made in one piece, so that by this means the advantages already described are likewise achievable in simple fashion. In a particular embodiment of the invention, the partial cylinders are arranged in such fashion that, in the direction of motion of the belt 5, a gap between two partial cylinders is followed by a further partial cylinder in such fashion that the gap lies in the path of the subsequent partial cylinder. In a further embodiment, the partial cylinder that follows the gap (or vice versa) is at least as wide as the gap itself.

Figure 4A:
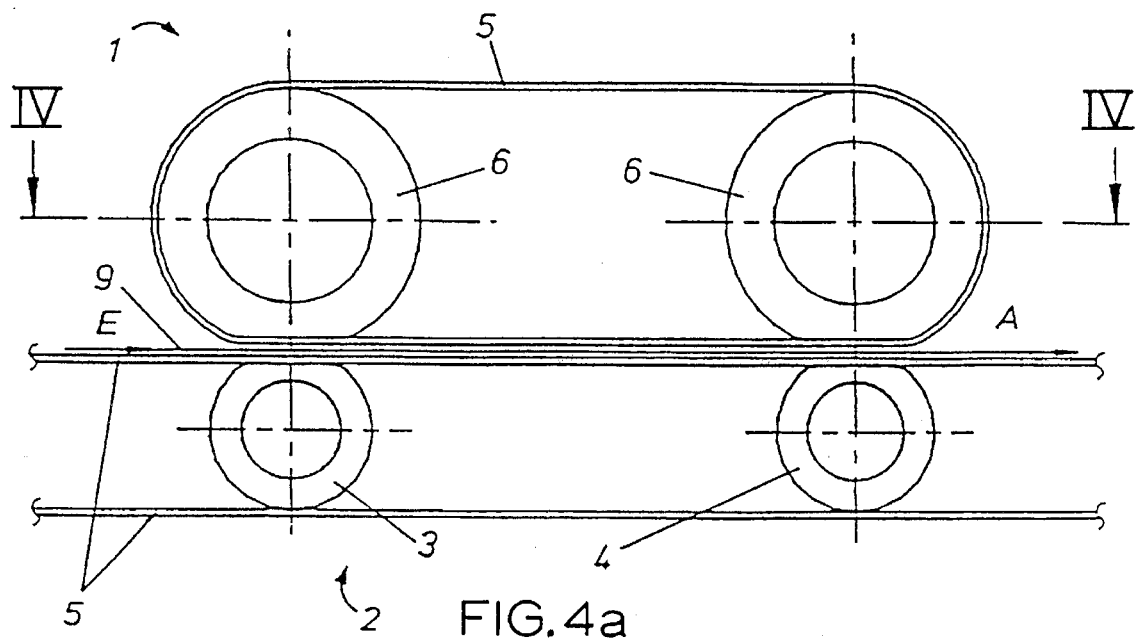
FIG. 4a is a side view of a pressing device having a belt guided around partial cylinders.
Figure 4B:
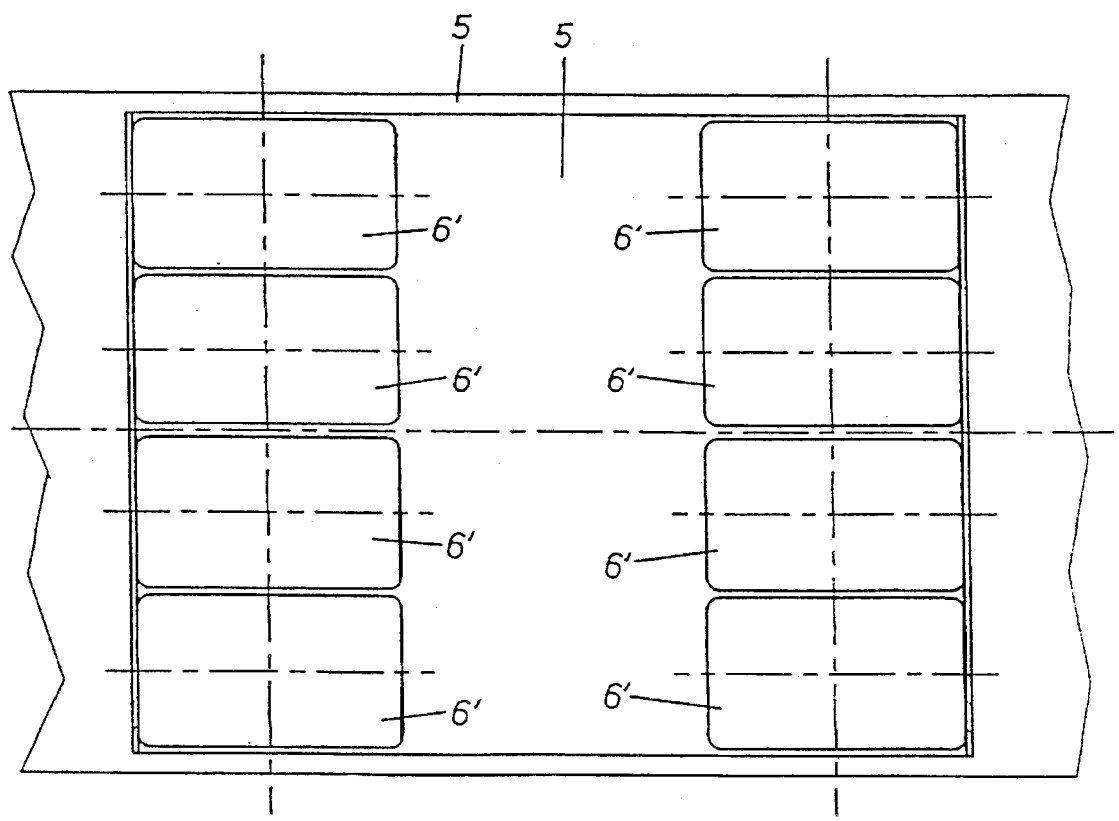

FIG. 4a and 4b show a pressing device having a belt guided around partial cylinders. The part 1 shown in FIG. 4a includes a belt 5, which is guided around the pressure cylinders 6, the pressure cylinders 6 consisting in turn of partial cylinders 6'. Here too it is conceivable that the partial cylinders 6' in their totality or individually are provided with the coating 7. It is likewise conceivable to make a pressure cylinders 6 mechanically deformable. Likewise, it is conceivable that the pressure cylinders 6 have a uniform or a nonuniform degree of deformability. It should be pointed out that the belts 5 of the two parts 1 and 2, despite the same reference number, can be different in form (in particular with regard to the material, the dimensions as well as the surfaces).

Figure 5A:
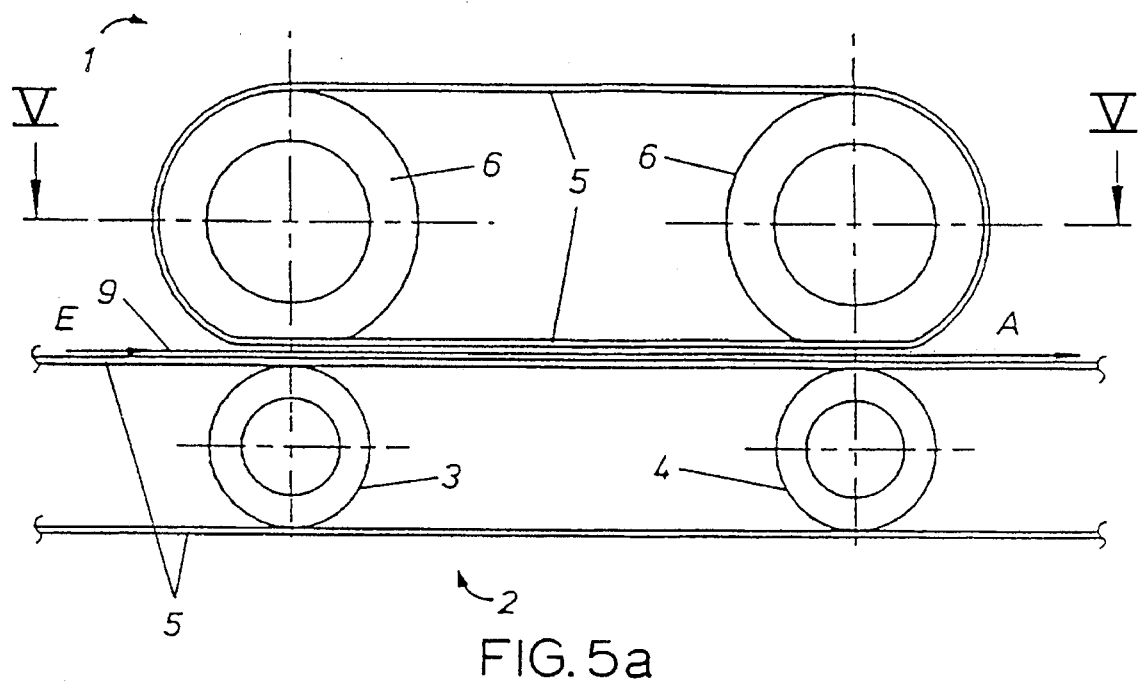
FIG. 5a is a side view of a pressing device having a belt guided around cylinders that have a rigid core.
Figure 5B:
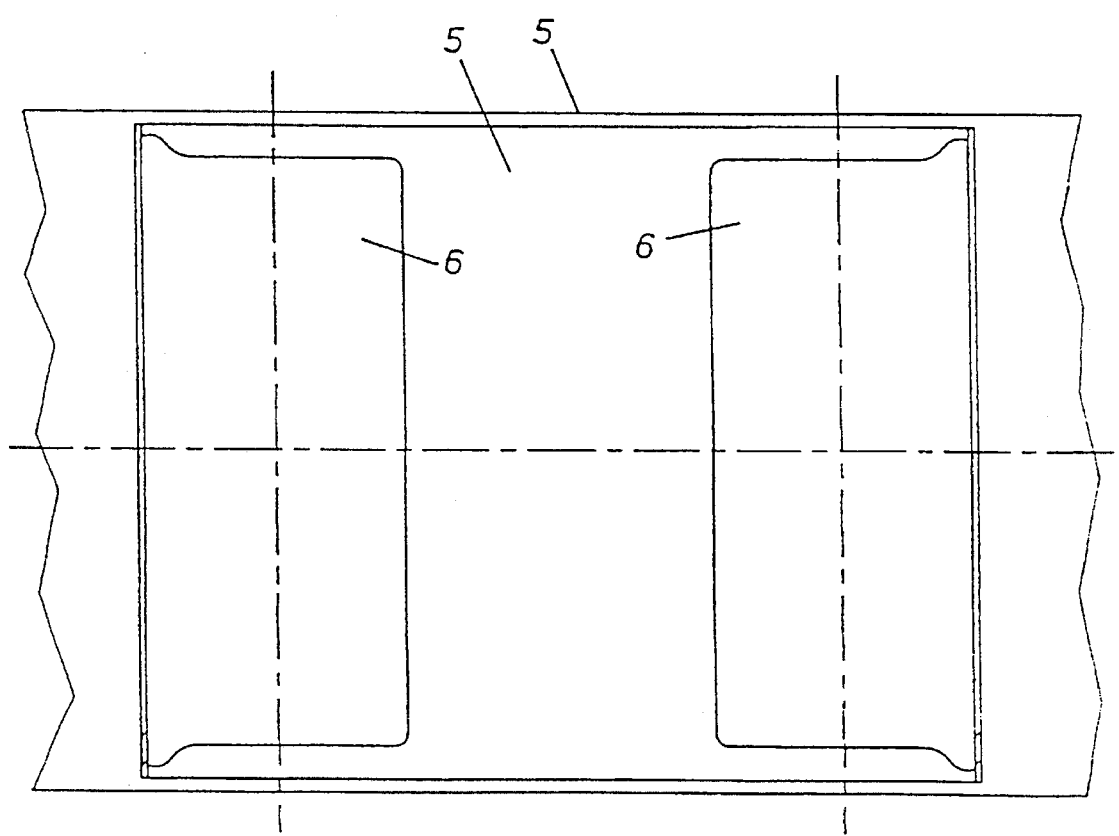

In the embodiment of the invention shown in FIG. 5a and 5b, the drive cylinder 3 and the guide cylinder 4 are rigid and the cylinders 6 are elastically deformable.

Figure 7:
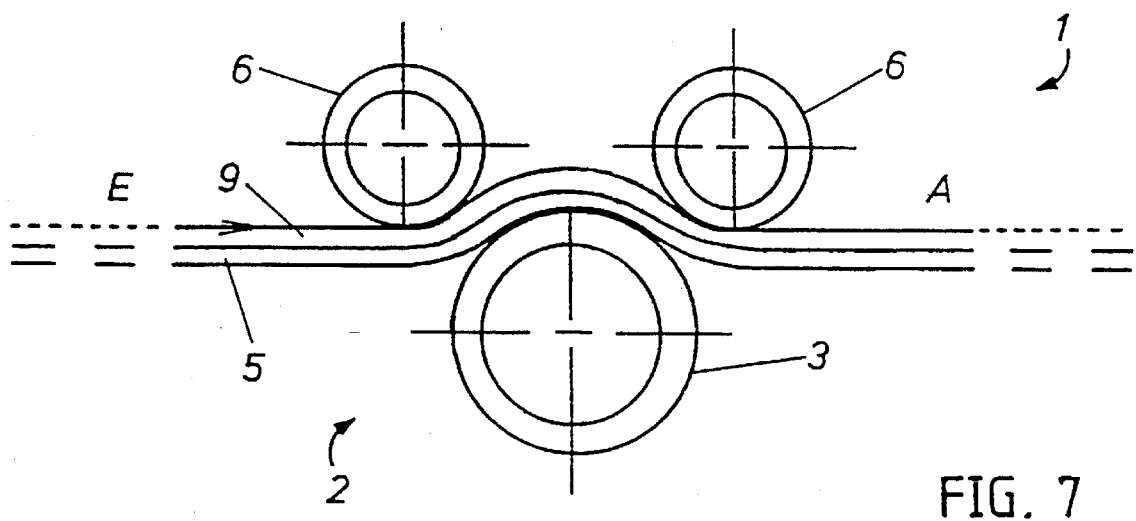
FIG. 7 shows a further embodiment of a pressing device.

In the foregoing description of the FIGS., one cylinder of the lower part 2 is assigned to or paired with at least one cylinder of the upper part 1, the axes of the cylinders of the two parts 1 and 2 being arranged vertically spaced in planes parallel to the belt 5. Further, the axes of the paired cylinders are arranged in a plane perpendicular to the horizontal of the belt 5 plane. Here it is conceivable to arrange the axes of the paired cylinders in a plane deviating from a plane perpendicular to the belt 5. In particular, to one cylinder of one part there can be assigned two cylinders of the other part (in the case of a straight guiding of the belt 5). One arrangement of the axes of the cylinders deviating from being in a plane perpendicular to the belt 5 is shown in FIG. 7.

Figure 6:
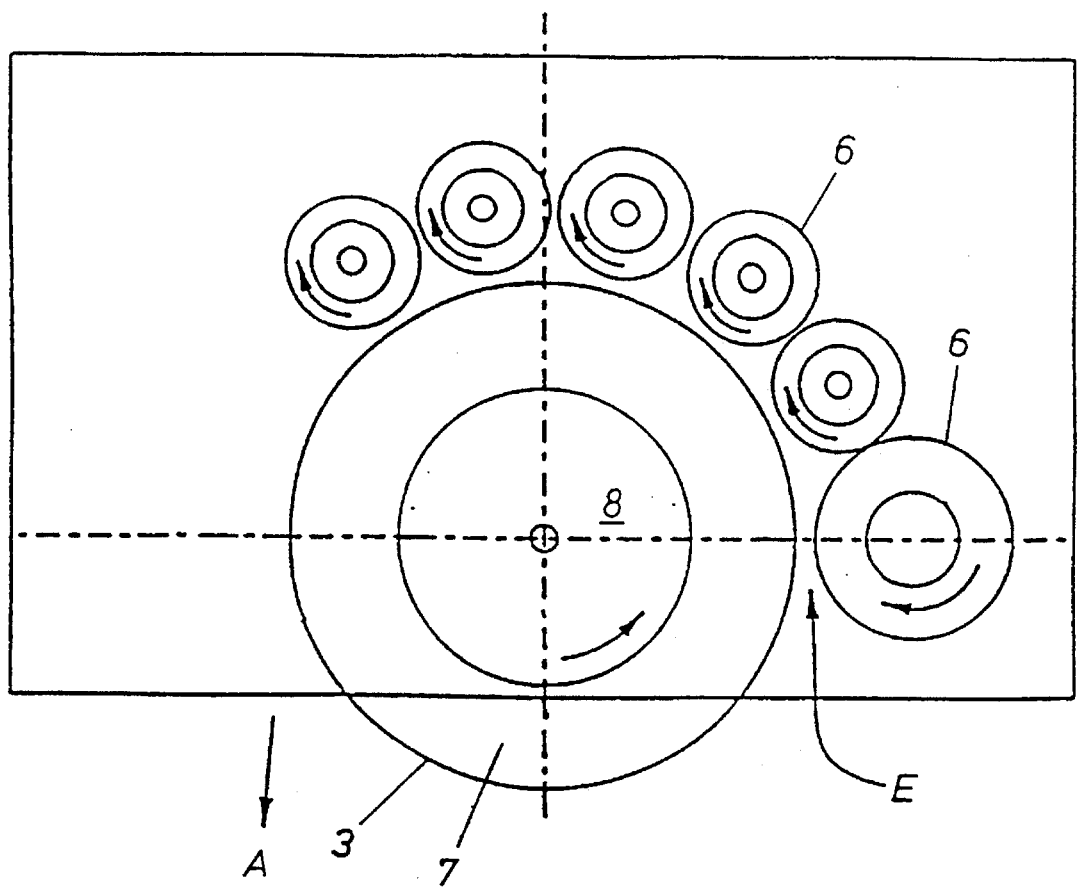
FIG. 6 shows a pressing device having cylinders arranged in circular fashion.

FIG. 6 shows a pressing device having cylinders arranged in circular fashion. Arranged on a partial circle or arc around one cylinder, in particular around the drive cylinder 3 of the part 1, are a plurality of circumferentially spaced cylinders, in particular a plurality of pressure cylinders 6, of the part 2. Also in this embodiment of the invention, at least one cylinder (for example the drive cylinder 3) is made elastically deformable. By this means, a further design embodiment of the pressing device is obtained, which is realizable alternatively to the pressing device described in FIGS. 1 a through 5b and 7. Also in this embodiment, the use of the belt 5 for at least one of the two parts is conceivable. The pressure cylinder 6 may take the form of a pneumatic tire mounted on a rim 8.

Figure 8:
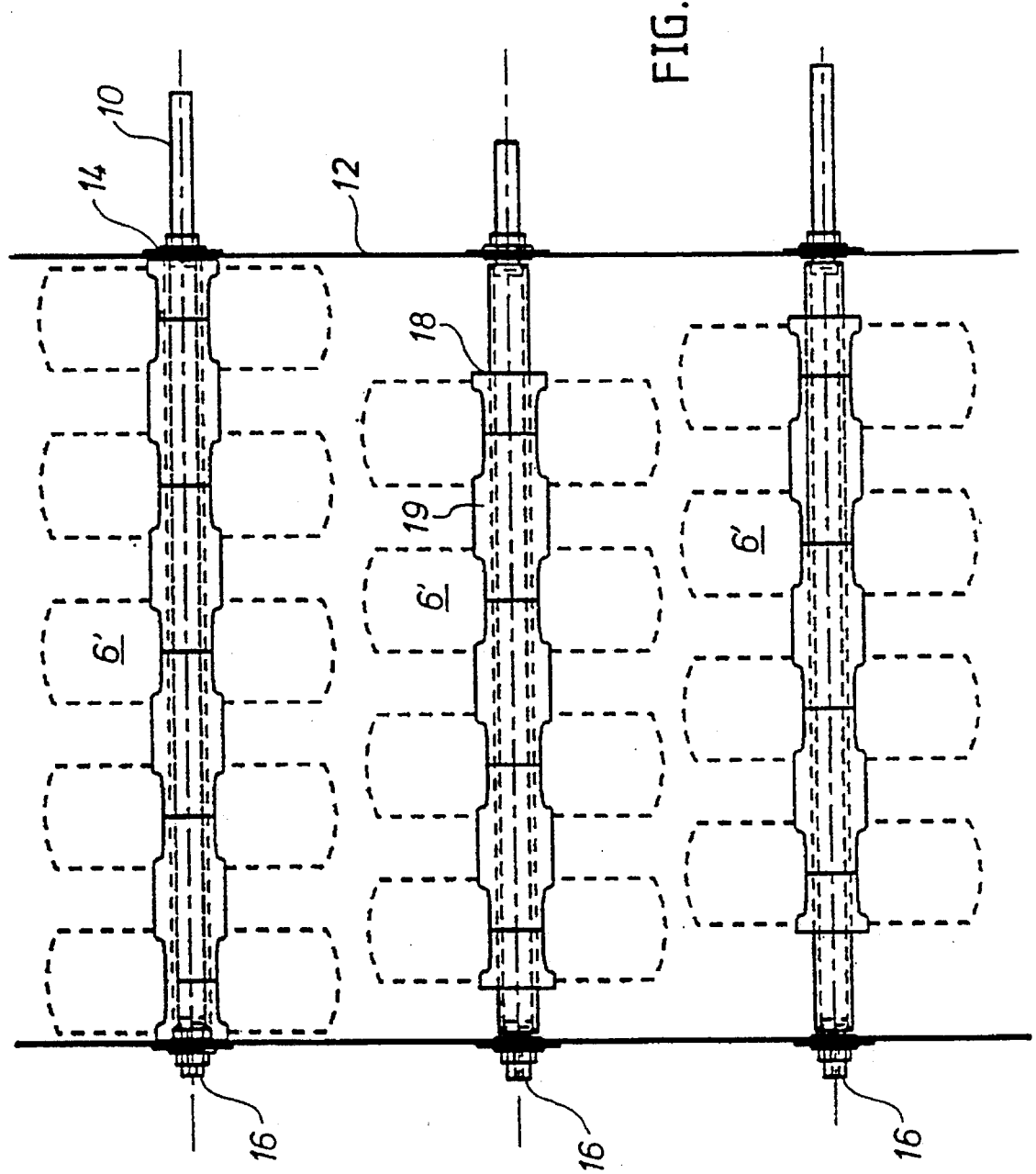
FIG. 8 shows a pressing device having pneumatic tires arranged in staggered fashion.

FIG. 8 shows a pressing device having pneumatic tires arranged in staggered fashion. The partial cylinders 6' made as pneumatic tires are arranged spaced apart on an axle 10. A plurality of these arrangements (three of them in FIG. 8) are supported in a frame 12, one support 14 in the frame 12 being provided to accept the axles 10, which support insures the accessibility of the axles 10 and accepts the forces arising during pressing. The air supply to the air tires is effected via an air supply 16 present on each axes 10, the partial cylinders 6' (pneumatic tires) being arranged on rims 18 and 19, respectively, on the axles 10.

Figure 9:
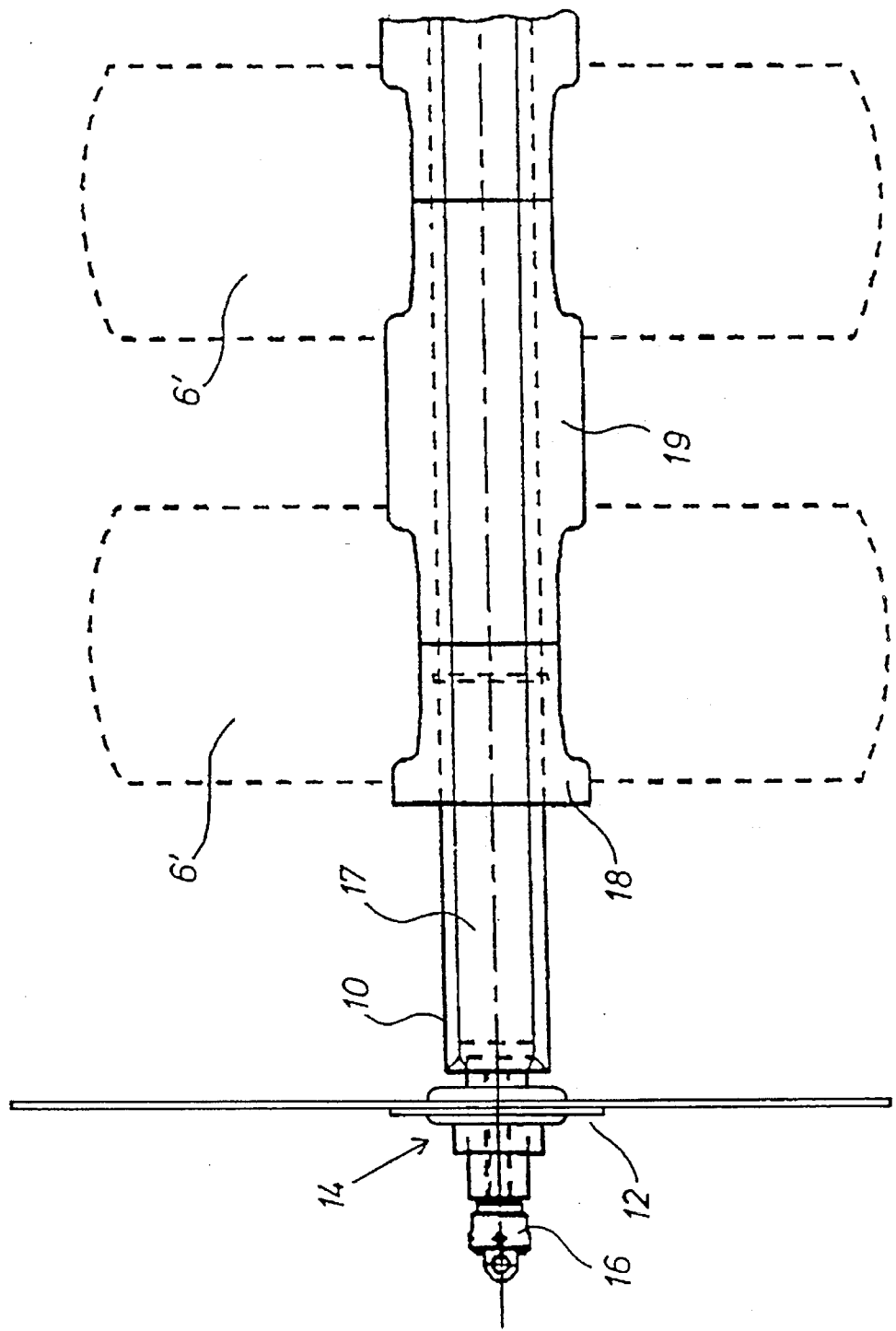
FIG. 9 shows a detail view of an arrangement with pneumatic tires.

FIG. 9 shows a detail view of an arrangement having pneumatic tires. The partial cylinders 6' (pneumatic tires) are arranged on rims 18 and 19 on the axle 10. The rims 18 and 19 are made in such fashion that, in assembly, first the rim 18 (end piece) is positioned in a specified position on the axle. Next follows the assembly of one partial cylinder, and the rim 19 follows. The rim 18 is made in such fashion that it accepts a single half of a partial cylinder 6', while the rim 19 accepts one half of a partial cylinder 6' at each of its two ends. At the outer regions of the partial cylinders 6', which are connected with the rims 18 and 19, respectively, said partial cylinders make an airtight seal. At the mating face between the rim 18 and 19 or at the mating faces of two rims 19, said rims are made in such fashion that an air supply to the pneumatic tires is obtained via a hole 17 bored in the axle 10 and an appropriate design of the mating faces (e.g., hole or slot). Moreover, it is conceivable to fasten the rims 18 and 19, respectively, to the axle 10 with a hollow dowel pin. This dowel pin, which is passed as perpendicularly as possible at least once through one rim and the axle 10, takes care of the fixing of the rim on the axle as well as serving as a conduit for the air supply. In dual performance, it is conceivable to provide the hollow dowel pin with a radial hole in the region of the interior of the axle for the purpose of air supply. The air supply advantageously takes place via the air supply 16 (for example a valve) in uniform fashion for all partial cylinders 6' placed on the axle 10. If an alternative construction is employed, it is conceivable to supply the partial cylinders arranged on one axle with unequal air pressure. Further, it is conceivable to provide a plurality of axles supported in the frame 12 (as is shown in FIG. 8) with air at a uniform pressure or to supply the individual axles arranged in the frame 12 separately with air at unequal pressures. A constant measurement of the air pressure is advantageously effected so that suitable actions (e.g., issuance of a malfunction signal or alteration of the air pressure) can be taken upon the air pressure deviating from a permissible range of values. The generation of the air pressure is taken care of by an independent compressor. Alternatively, it is conceivable to use a compressor that is driven by a drive motor of the harvester.

It should be pointed out that the cylinders shown in the Figures and provided with the same reference numbers can be differently designed with respect to material, dimensions, surface (e.g., rough/smooth), arrangement, type (elastically deformable surface/pneumatic tires/solid rubber tires in combination with rigid cylinders) or other features. Within the pressing device as a whole (or within the individual parts), the number of unlike or like cylinders is variable. In general, a hollow body loadable from inside with a pressure higher than atmospheric by means of a fluid medium is conceivable for the achievement of the elastic deformation, the hollow body having a flexible envelope. Such an envelope has for example, at least one inner part consisting of an expanded foam material having closed pores, the volume of which is variable by means of a pressure of the fluid medium, and an outer part which is largely inelastic.

I claim:

1. A mobile green fodder conditioner comprising:

at least one fodder pressing device including, a first part having a first cylinder and a second part having a second cylinder and a third cylinder, said second and third cylinders being associated with said first cylinder to form pressing nips through which grass is conveyed, each of said second and third cylinders including a plurality of partial cylinders, said partial cylinders of said third cylinder being in staggered relation in an axial direction relative to said partial cylinders of said second cylinder;

one of said cylinders being a drive cylinder;

said partial cylinders of said second and third cylinders being elastically deformable, said cylinders having substantially parallel horizontal axes disposed transverse to the direction of travel of said conditioner when operating to condition green fodder.

2. The conditioner of claim 1 and further comprising a belt for carrying green fodder through said nips, said first cylinder being disposed on one side of said belt and said second and third cylinders being disposed on the other side of said belt.

3. A mobile green fodder conditioner comprising:

a fodder pressing device including,
- a belt for conveying green fodder in an inlet to discharge fodder moving direction,
- a first cylinder disposed on a first horizontal axis transverse to said fodder moving direction and in supporting relation to said belt,
- a second cylinder disposed above said belt on a second horizontal axis parallel to said first horizontal axis and comprised of a plurality of elastically deformable annular segments arranged in axially spaced side-by-side relation to one another on said second horizontal axis and
- a third cylinder disposed above said belt on a third horizontal axis parallel to said first horizontal axis and spaced from said second horizontal axis in said fodder moving direction, said third cylinder comprising a plurality of elastically deformable annular segments arranged in axially spaced side-by-side relation to one another on said third horizontal axis, said annular segments of said third cylinder being in staggered relation in an axial direction relative to said annular segments of said second cylinder,
- said second and third cylinders being positioned sufficiently close to said first cylinder to form pressing regions for said green fodder conveyed by said belt.

4. The conditioner of claim 3 wherein said annular segments are pneumatic tires.

5. The conditioner of claim 4 and further comprising means for varying the air pressure in said pneumatic tires during operation of said conditioner.

6. The conditioner of claim 5 including means for establishing unequal air pressure in selected tires.

7. A conditioner for green fodder preparation comprising:

a green fodder device including:
- a belt for conveying green fodder in an inlet to discharge fodder moving direction,
- fist and second cylinders disposed beneath said belt on parallel horizontal axes transverse to said fodder moving direction, said first and second cylinders being in supporting relation to the underside of said belt,
- third and fourth cylinders disposed above said belt on parallel horizontal transverse axes said third cylinder being directly above said first cylinder and said fourth cylinder being directly above said second cylinder whereby said first and third cylinders form a first green fodder pressing region and said second and fourth cylinders form a second green fodder pressing region,
- each of said third and fourth cylinders being comprised of a plurality of elastically deformable annular segments arranged in axially spaced side-by-side relationship to one another, said annular segments of said fourth cylinder being in staggered relation in an axial direction relative to said annular segments of said third cylinder.

8. The conditioner of claim 7 wherein said annular segments are pneumatic tires.

9. The conditioner of claim 8 and further comprising means for varying the air pressure in said pneumatic tires during operation of said conditioner including means to establish unequal air pressures in selected tires.

10. The conditioner of claim 7 and further comprising an endless belt guided around said third and fourth cylinders.

* * * * *